(No Model.) 7 Sheets—Sheet 1.

J. Q. ADAMS.
CORN SHELLER.

No. 582,335. Patented May 11, 1897.

Witnesses
C. F. Blake
A. A. Murray

Inventor
John Q. Adams.
By Coburn & Thacher
Attys (No Model.) J. Q. ADAMS. 7 Sheets—Sheet 2.
CORN SHELLER.
No. 582,335. Patented May 11, 1897.

Witnesses
C. F. Blake
A. A. Murray

Inventor
John Q. Adams
By Coburn & Thacher
Attys

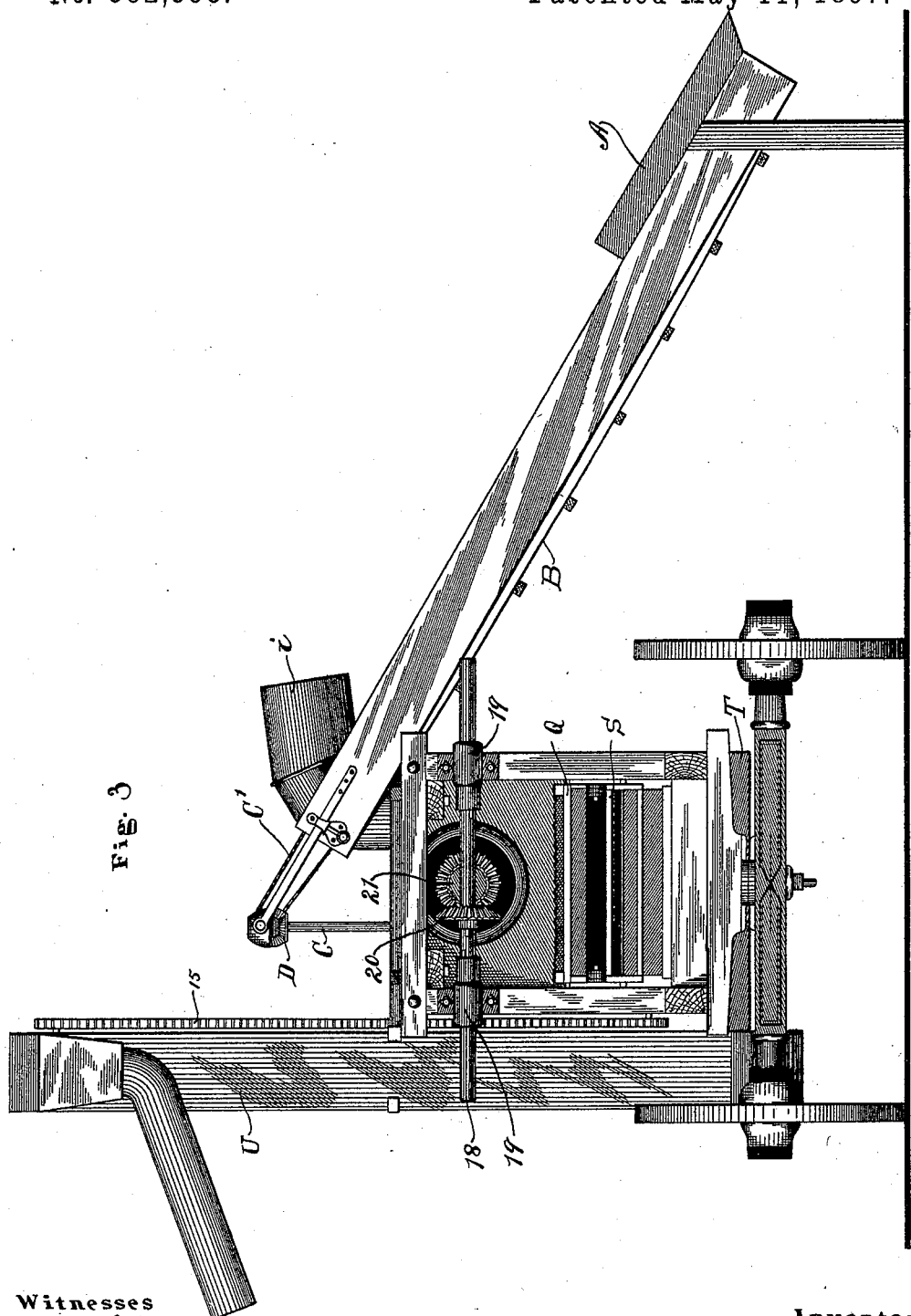

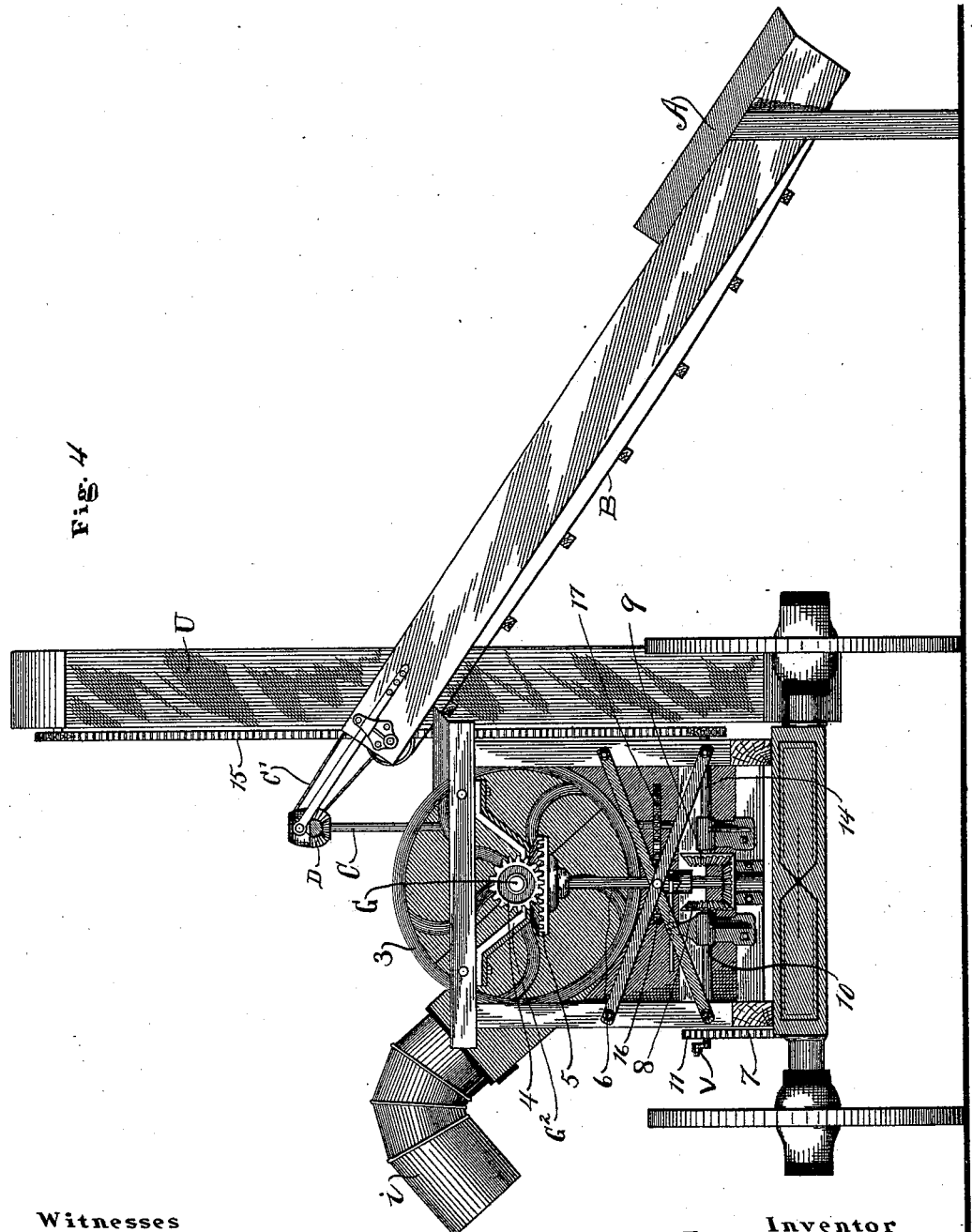

(No Model.) 7 Sheets—Sheet 5.
J. Q. ADAMS.
CORN SHELLER.
No. 582,335. Patented May 11, 1897.
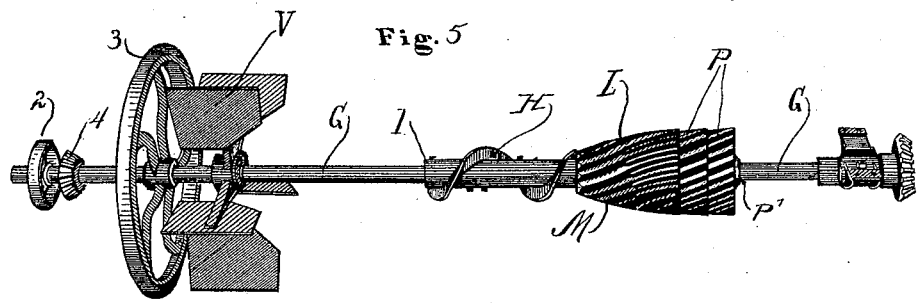
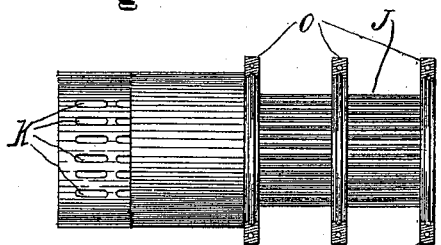
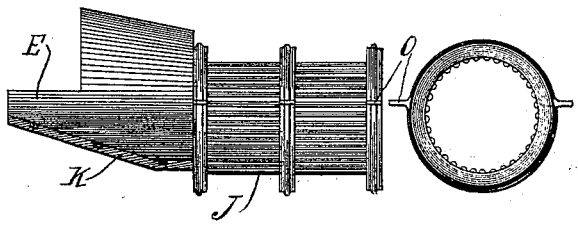
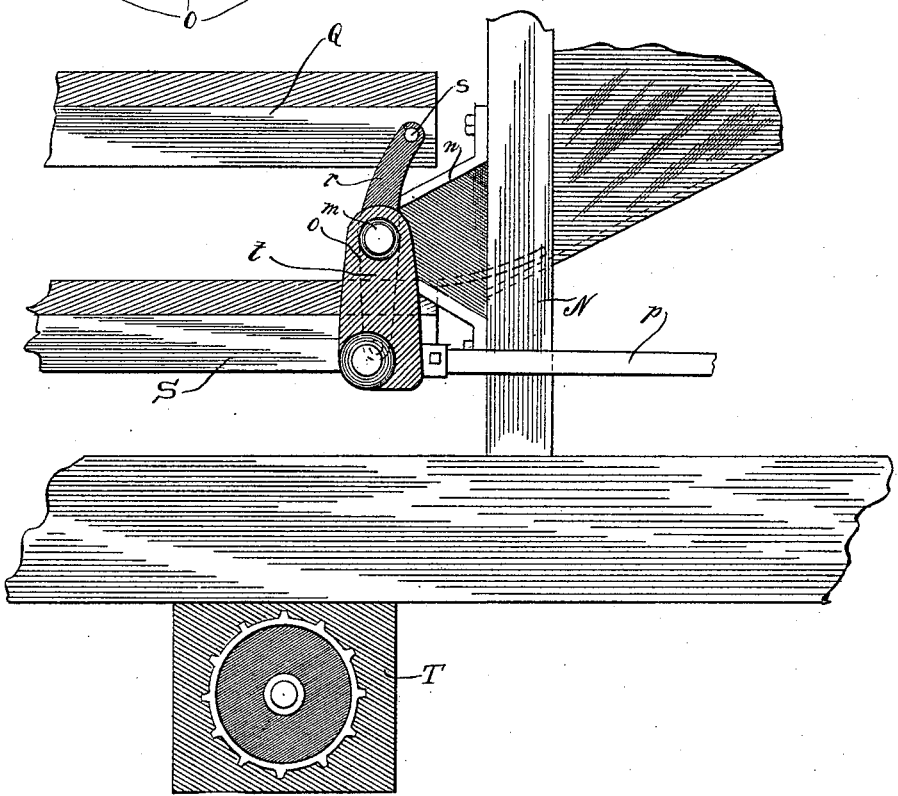
Witnesses
C. F. Blake
A. A. Murray
Inventor
John Q. Adams.
By Coburn & Thacher
Attys (No Model.) 7 Sheets—Sheet 6.
J. Q. ADAMS.
CORN SHELLER.
No. 582,335. Patented May 11, 1897.
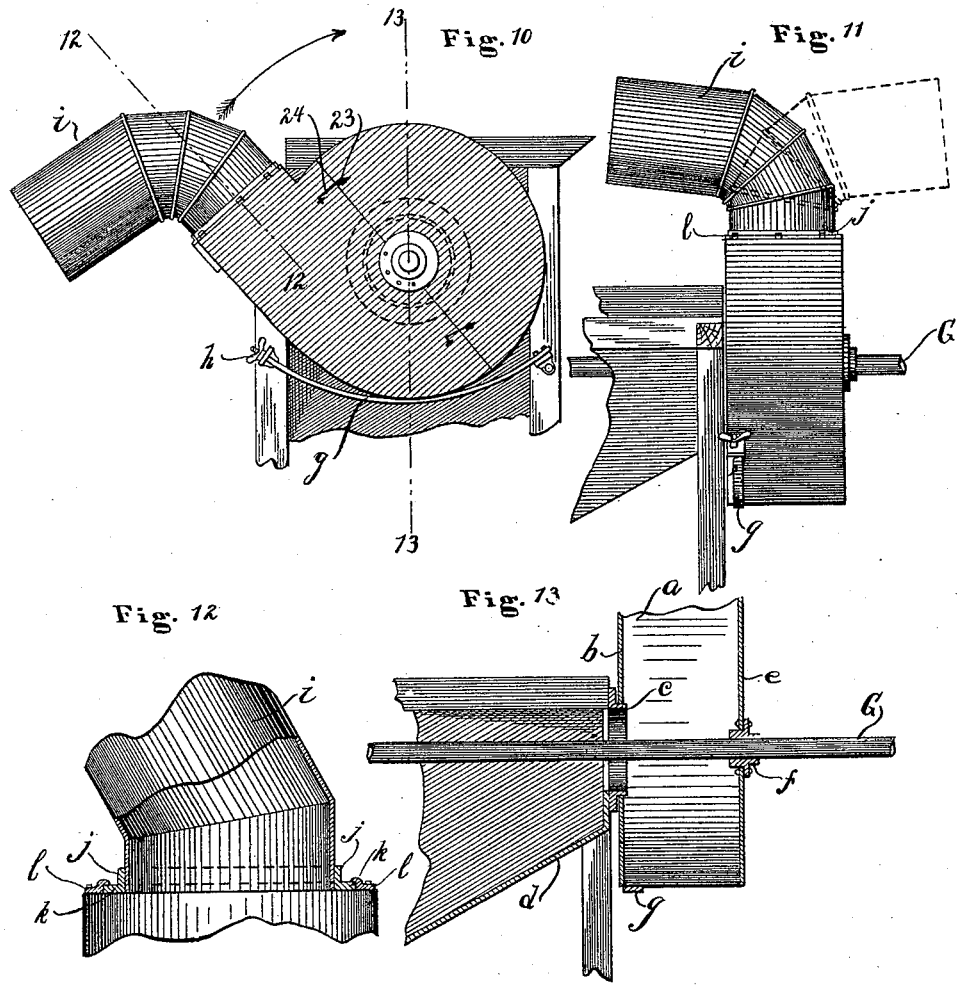
Witnesses
C. A. Blake
A. A. Murray
Inventor
John Q. Adams.
By Coburn & Thacher
Atty.

(No Model.)

7 Sheets—Sheet 7.

J. Q. ADAMS.
CORN SHELLER.

No. 582,335. Patented May 11, 1897.

Witnesses
W. C. Corliss
H. G. Strong.

Inventor
John Q. Adams
By Coburn & Thacher
Attys

UNITED STATES PATENT OFFICE.

JOHN Q. ADAMS, OF MARSEILLES, ILLINOIS.

CORN-SHELLER.

SPECIFICATION forming part of Letters Patent No. 582,335, dated May 11, 1897.

Application filed August 29, 1895. Serial No. 560,902. (No model.)

*To all whom it may concern:*

Be it known that I, JOHN Q. ADAMS, a citizen of the United States, residing at Marseilles, in the county of La Salle and State of Illinois, have invented certain new and useful Improvements in Corn-Shellers, which are fully set forth in the following specification, reference being had to the accompanying drawings, in which—

Figure 1:
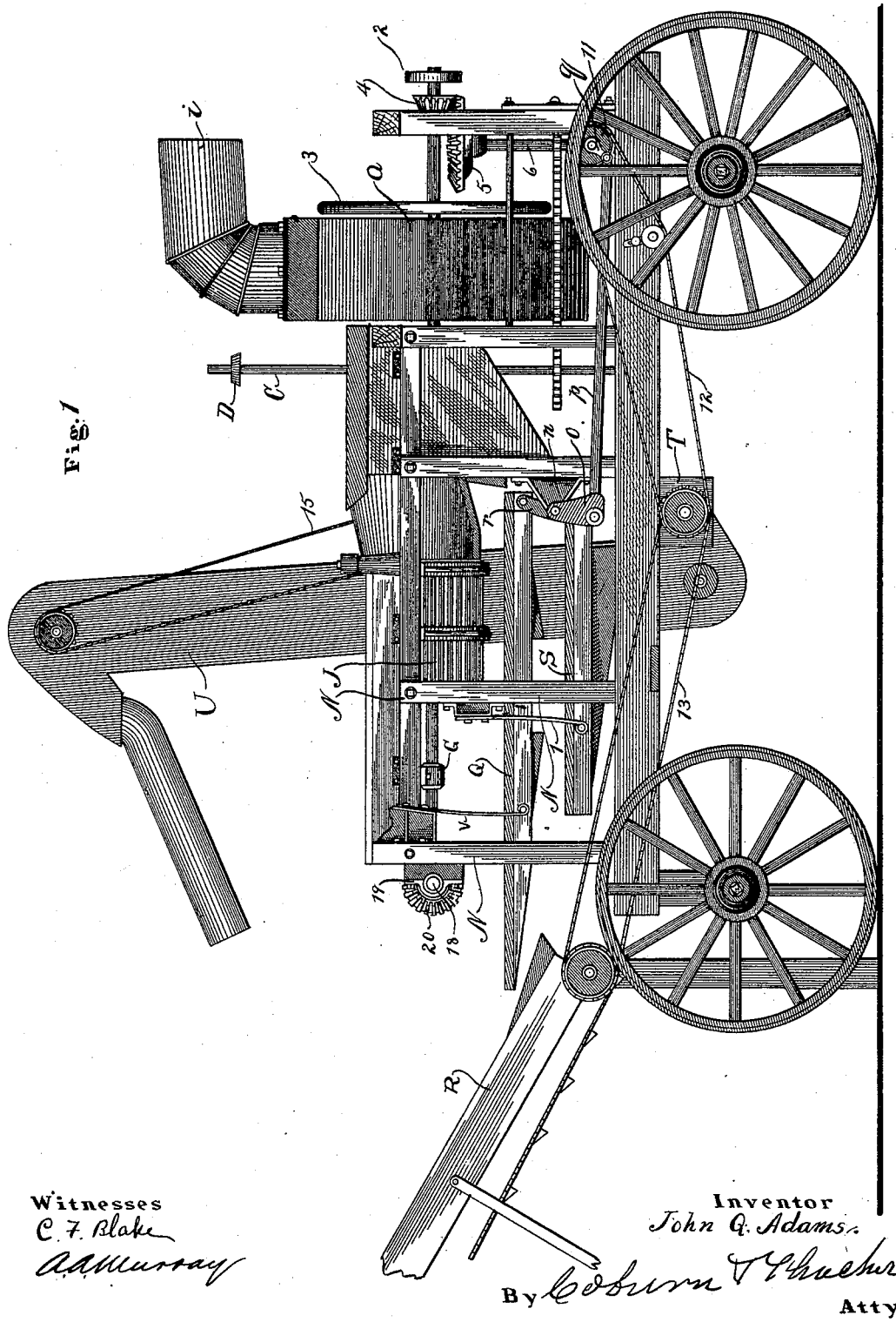
Figure 2:
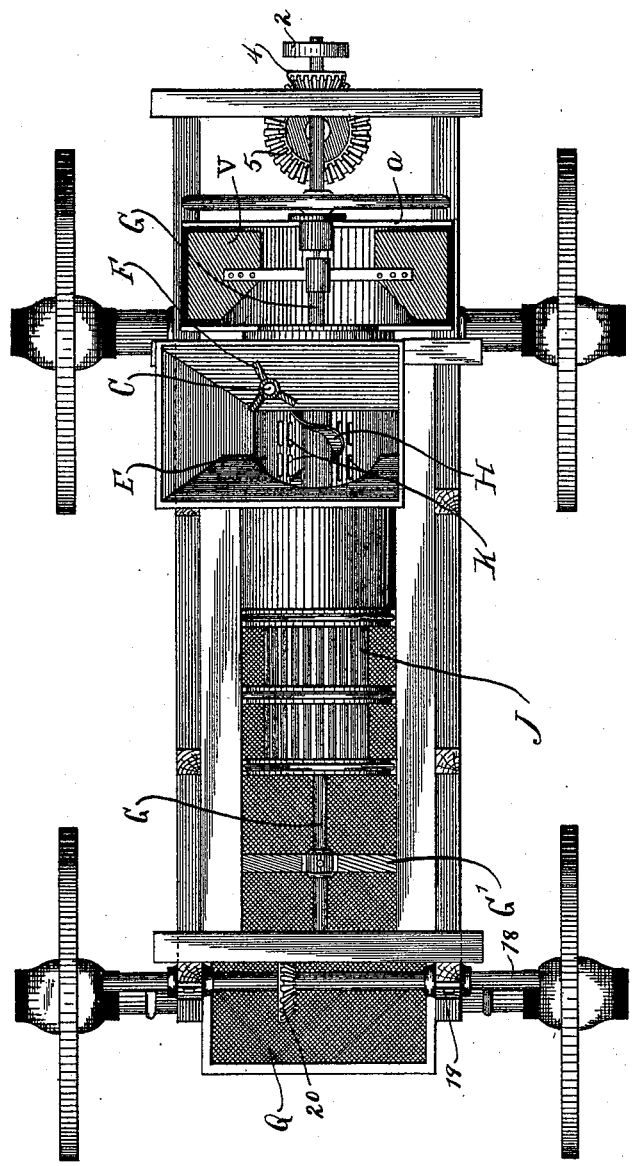
Figure 14:
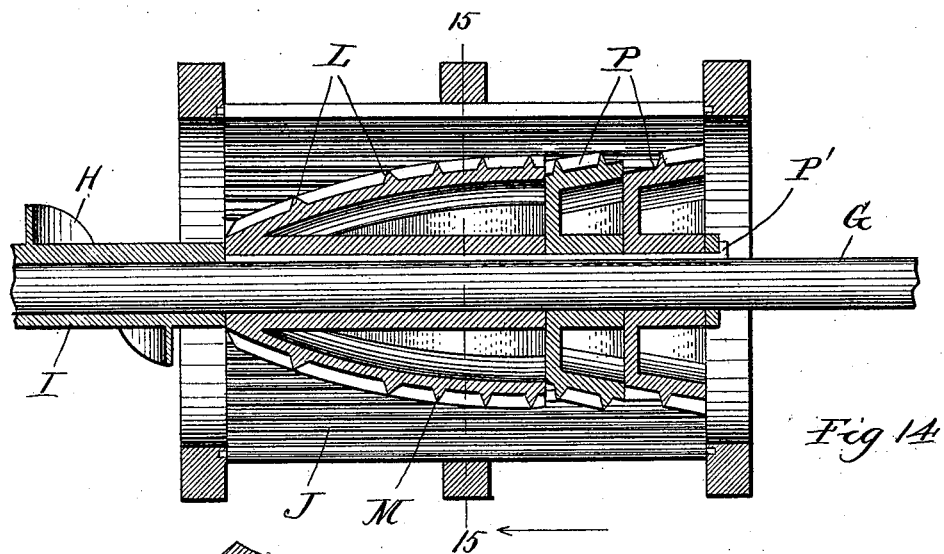
Figure 15:
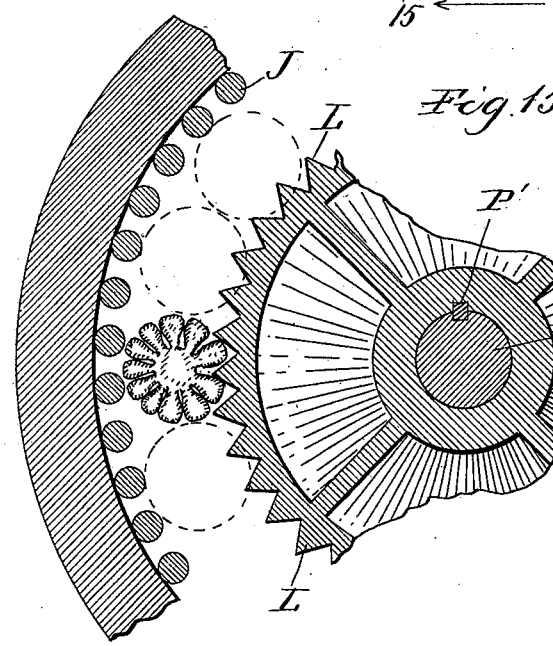
Figure 16:
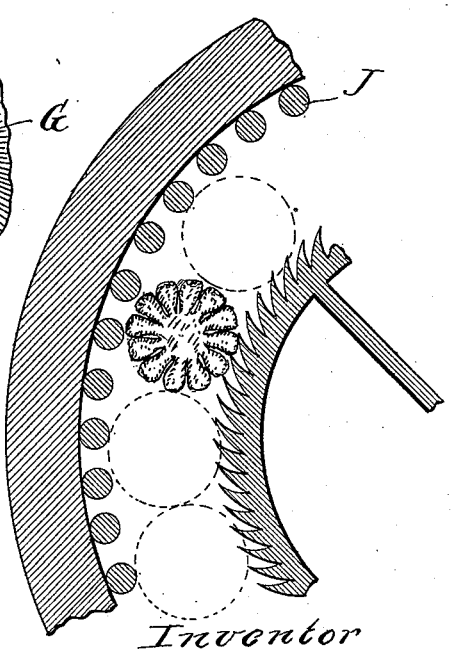

Figure 1 is a side elevation of my machine mounted on wheels ready for use. Fig. 2 is a top plan view of the frame of my machine with the cob, grain, and corn conveyers and the top portion of the fan-case removed. Fig. 3 is a front elevation of my machine with the cob-conveyer removed. Fig. 4 is a rear elevation of my machine. Fig. 5 is a perspective view of the main shaft of my machine with the parts which it carries attached thereto. Fig. 6 is a top or plan view of the skeleton shelling-cylinder and feeding-hopper detached. Fig. 7 is a side elevation of the same. Fig. 8 is a detached view of one of the rings of the skeleton shelling-cylinder. Fig. 9 is an enlarged detached view of that portion of my machine which supports and operates the rear ends of my cob and grain screens. Fig. 10 is a detached view of a portion of my machine which carries the fan-case with the fan-case shown in position. Fig. 11 is an edge view of the same part shown in Fig. 10. Fig. 12 is a detached sectional view taken at the line 12 12, Fig. 10, showing the method of attaching the elbow discharge-pipe to the fan-case. Fig. 13 is a sectional view taken at the line 13 13, Fig. 10, showing the method of attaching the fan-case to the machine. Fig. 14 is a longitudinal sectional view of the shelling-cylinder and shelling-cone mounted therein. Fig. 15 is a still further enlarged section, on the line 15 15, of a portion of such cylinder and cone, showing the cone-flanges in contact with the corn-kernels. Fig. 16 is a view similar to Fig. 15, showing a cone provided with flanges of the form heretofore employed.

My invention relates to cylinder corn-shellers.

I have shown my corn-sheller mounted on wheels, so that it can be readily drawn from place to place, it being adapted to what is known as "farm use," but the wheels and mountings constitute no part of my invention, as I contemplate using the machine in mills or other buildings where it is desired to shell corn.

My invention consists in the construction of the shelling-cone, which adapts it to shell the corn in connection with the skeleton cylinder, within which it revolves, whereby I am enabled to rapidly and with great efficiency completely shell the corn, seldom breaking the cobs or removing any considerable portion of the chaff from the cob.

The chief feature in the construction of my improved shelling-cone is the shape of the flanges carried thereby, which will be hereinafter particularly described.

My invention also further consists in the combination, with this shelling-cone, of supplemental sections of shelling-cones added thereto, and also in the force-feed device in connection with the said shelling-cone.

My invention further consists in the devices and combination of devices with which I support and operate the separating-screens of my sheller, and also in the devices used for attaching and operating my fan-case and its attachment, which enables me to deliver the dirt and chaff drawn from my sheller in any desired direction from the machine.

To enable those skilled in the art to understand how to make and use my invention, I will proceed to describe the same with particularity, using the same letters and figures of reference to indicate the corresponding parts of the machine illustrated in the different figures of the drawings.

The corn to be shelled is dumped into the hopper A of the feeding device, from which it is carried by an endless conveyer B, which is driven from the upright shaft C by means of beveled gear-wheels D, by which power is transmitted to the endless carrier in the usual manner by endless chain C'. This feeding device for feeding the corn into the machine constitutes no part of this invention. The corn is delivered by the endless carrier B into the hopper E of the machine. The vertical shaft C passes vertically through this hopper and carries short arms F, which agitate the ears of corn in the hopper of the machine and prevent the corn from lodging on the sloping sides of the hopper or clogging therein.

The main shaft G of my machine passes horizontally through the lower portion of the hopper E, having bearings G' and G², supported on the frame of the machine, carrying therein a spiral flange H, which is secured to a tube I, that is fastened securely to the shaft G. The bottom of the hopper E slants downward toward the skeleton cylinder J, and it also is perforated with open slots K for the corn which is shelled in the hopper to fall through.

L is my shelling-cone, which is rigidly secured to the main shaft G and is provided with spiral flanges M. This cone is located within the skeleton cylinder K, which is rigidly fastened to the frame N by means of the flanges O. I preferably make the flanges M on my shelling-cone V-shaped in cross-section and spiral on the cone, so that the corn is fed rapidly forward in the skeleton cylinder J by the flanges of the shelling-cone as it is rapidly revolved. I find that these flanges on the shelling-cone having frictional contact with the ears of corn revolve the ears between the shelling-cone and the skeleton cylinder, bringing all parts of each ear of corn in contact with each other and with the shelling-cone and the skeleton cylinder, rapidly shelling the corn and seldom breaking the cobs. While most of the ears of corn in being fed forward assume a position so that they pass endwise through the shelling device, still, as the ears of corn are forced by the force-feed in contact with the flanged shelling-cone, they crowd one upon another, being rapidly revolved between the flanges of the shelling-cone and the inclosing skeleton cylinder. They are not broken, even if carried through the shelling devices without assuming an endwise movement.

An important feature of my invention is the construction of the flanges carried by the cone V-shaped in cross-section. The said flanges by being so formed enter between the adjacent rows of the kernels of corn upon the cob and by a wedge action detach the said kernels without in any way breaking or injuring them. This action of the V-shaped flanges, which coöperate with the skeleton shelling-cylinder, holding the cobs in position to be subjected to such action, is materially different in its result from prior constructions, such as illustrated in Fig. 16 of the drawings. In such prior constructions it has been customary to provide the cone with teeth of the form shown in said Fig. 16, or some analogous form, the edges of the teeth more or less overhanging their bases and the side being commonly curved in cross-section. The effect of such teeth, even in combination with a shelling-cylinder such as shown, is more or less to disintegrate the kernels of corn themselves in the process of removing them from the cob. Such disintegration, which is desirable when corn and cob are to be ground up together, is most undesirable in a purely shelling operation, and all such devices hitherto used in corn-shellers proper have had the defect of injuring the kernels of corn.

P P are two additional sections of cones, showing how one or more of these additional sections of flanged cones may be added to the main shaft of the machine to facilitate the change of position of the ears of corn in passing through the shelling mechanism as they drop from the shelling-cone L to the supplemental or added sections P of the shelling-cones, these cones being keyed to the shaft, one key being shown at P'. These sections of shelling-cones are flanged the same as the shelling-cone L, the flanges being substantially in the same direction, although they may not be attached so that the flanges join each other at their ends. I find that if the flanges do not join the flange of an added section ending between the flanges of the shelling-cone they have the effect to interrupt the ears of corn and change their positions relative to the shelling mechanism and each other, thereby facilitating the work of shelling.

It will be seen that as the corn is delivered by the feed mechanism above described into the hopper E the force-feed device H, revolving rapidly, not only feeds the corn forward to the shelling-cone, but commences shelling it in the hopper, the shelled corn falling through the slots in the bottom of the hopper, and as the corn is passed rapidly in great quantities to the shelling-cones in the skeleton shelling-cylinder it is forced forward by the spiral flanges on the shelling-cones and at the same time the ears are revolved, completely shelling the corn from the cob, the shelled corn falling through the skeleton cylinder, the cobs being delivered from the forward end of the skeleton cylinder onto the cob-screen Q, from which they are carried forward and delivered on the cob conveyer or stacker Q, the shelled corn falling through the cob-screen R onto the corn-screen S, from which it is carried into a worm conveyer T, by which it is carried to the elevator U.

There is attached to the main shaft G of the machine a fan V, around which there is a fan-case a. This fan-case has a lateral central opening, through which the air is rapidly drawn into the fan-case as the fan is revolved therein. This air is drawn through the shelling mechanism of the machine and also through the screens of the machine, the frame of the machine which incloses the shelling mechanism and the screens being tightly cased, as shown in Figs. 3 and 4, said case being removed in Fig. 1 to show the shelling mechanism and the screens.

One side b of the fan-case a has a circular opening which fits on the flanged annular collar c, that is rigidly attached to the case d, and the side of the fan-case e is secured to the flanged collar f, which loosely fits on the main shaft G. It will be seen that the fan-case is mounted in such way that it is revoluble on its bearings. The fan is attached to the shaft G within the fan-case, as clearly shown in Fig. 2 of the drawings, the fan not being shown in Fig. 13, which shows the detail attachment of the fan-case to its bearings on which it is revoluble.

$g$ shows a flexible strap which has frictional contact with the fan-case, the end of said strap being screw-threaded, so that it can be tightened and loosened by means of a thumb-nut $h$, as clearly shown in Fig. 10 of the drawings.

$i$ is an elbow-pipe attached to the outlet of the fan-case by means of an annular flanged ring $j$, that is firmly secured to the end of the elbow-pipe in such way that the flange $k$ passes under the flanged lugs $l$, which are fastened to the fan-case, as clearly shown in Fig. 12. This attachment of the elbow-pipe to the case admits of the elbow-pipe being revolved on the fan-case, so as to discharge the dust and dirt from the fan-case in any desired direction from the fan-case at an angle thereto. It will be seen that by revolving the fan-case on its bearings the outlet of the fan-case can be brought to any position within the circle of the revolution of the fan-case, while by revolving the elbow-pipe $i$ on its bearings on the fan-case the dust and dirt can be discharged to either side of the fan-case, thereby enabling me to adjust the devices which discharge the dust and dirt from the fan to conduct it to any desired point from the fan-case.

The device which carries and vibrates the cob-screen Q and the corn-screen S is composed of the rock-shaft $m$, which has bearings in brackets $n$, there being two of said brackets, one near each side of the machine firmly secured to the uprights of the frame N of the machine.

$o$ is an arm, one end of which is rigidly secured to the rock-shaft $m$ and the other end pivotally connected to the pitman $p$, driven by the crank $q$. As the pitman $p$ vibrates the arm $o$ rocks the rock-shaft $m$. There are rigidly attached to the rock-shaft $m$ two upright arms $r$, their upper ends being forked or bifurcated so as to receive and support the side pieces of the cob-screen Q, the side pieces of the screen being held in these forked ends of the arms $r$ by pins $s$, which pass loosely through the side pieces of the screen. These forked arms $r$ are so connected to the rock-shaft $m$ that in their normal positions they are inclined at quite an angle to a vertical line drawn through the rock-shaft, as shown in Fig. 9. There are also two other arms $t$, rigidly attached to the rock-shaft $m$, projecting downward therefrom, which carry the corn-screen S, these arms being attached to the sides of the corn-screen by pins $u$, (shown by dotted lines in Fig. 9,) which pass loosely through the side pieces of the screen. The front end of the cob-screen Q is held by the spring-straps $v$, there being one at each side of the cob-screen, and the front end of the corn-screen S is held suspended by the spring-pieces 1. As the rock-shaft $m$ is rocked the arms $r$ are thrown to a vertical position and at the same time the spring-straps $v$ are forced forward, raising the front end of the screen, while the arms $r$ raise the rear end of the screen, the spring-straps pressing the screen back and down as the rock-shaft carries the arm $r$ back and down, by which I constantly give the cobs on the screens a tossing motion, sending them forward and at the same time stirring them on the screen to completely separate the corn therefrom. The power for driving my corn-sheller is applied to the main shaft G of the machine by the drum 2, which carries the corn-shelling mechanism and also the fan V. I place upon this main shaft a balance-wheel 3. This shaft also carries a bevel-wheel 4, which engages with the bevel-wheel 5 on the vertical shaft 6, which vertical shaft also carries a bevel-wheel 7, with which the bevel-wheels 8 and 9 engage, the bevel-wheel 8 being on the shaft 10, which carries a sprocket-wheel 11 and a crank $q$. The endless chain 12 drives the screw conveyer in T, as clearly shown in Fig. 1, and the endless chain 13 drives the elevating mechanism in the cob-stacker. The crank $q$ drives the pitman $p$ and operates the screens which vibrate the rock-shaft and gives motion to the screens Q and S, as above described. The bevel-wheel 9 operates the shaft 14, which also carries a sprocket-wheel that operates the endless chain 15, that elevates the shelled corn in the elevator. The vertical shaft 6 also carries a sprocket-wheel 16, that carries an endless chain to the sprocket-wheel 17 on the vertical shaft C, and through it the devices which feed the corn into the machine are operated, as above described.

I have shown a shaft 18, carried in bearings 19 on the front uprights of my machine, which shaft carries bevel-gear 20, which engages with the bevel-gear 21 on the main shaft G of the machine. When more convenient to apply the power for driving the machine to this shaft 18 instead of to the drum 2, all of the operative parts of the machine will be driven, as above described, the same as if the power is applied to the main shaft through the drum 2.

My fan-case is divided in two parts at the line 23, which parts are held together by means of hooks 24, so that a portion of the case can be removed, as shown in Fig. 2 of the drawings, but in whatever position the fan-case is turned the friction-strap $g$ presses against it sufficiently to hold it in that position, as above described.

I find that in practice my corn-shelling device composed of the flanged conical sheller revolved in the skeleton shelling-cylinder in connection with the force-feed for forcing the corn to the conical sheller shells corn very rapidly and at the same time shells it without breaking the cobs to any considerable extent and without removing any considerable quantity of chaff from the cobs, so that the chaff which is drawn out through the fan is very much less than with the ordinary method of shelling. I also find that I am enabled to deliver the dirt and chaff from the fan-case at any desired direction from the machine, which is frequently a great convenience in the practical operation of the machine. I also find that I am able to deliver the cobs from the cob-screen of the machine rapidly, separating the corn entirely therefrom on account of the special method of hanging the screens on the rock-shaft and giving them an upward and forward motion, which will send the cobs forward on the screens rapidly.

So far as the general construction of the frame of my machine is concerned and the gearing and devices by which the power is transmitted to the various parts thereof I do not claim in this application any invention, as they may be constructed in any of the well-known methods or by methods which I have shown and fully described in prior patents.

Having fully described the construction and operation of my invention, what I claim, and desire to secure by Letters Patent, is—

1. In a corn-shelling machine, a flanged shelling-cone made revoluble within a skeleton shelling-cylinder; the flanges being V-shaped in cross-section, to wedge between the rows of grains and a shelling-cylinder within which the flanged shelling-cone is revoluble, the ears being caused to pass longitudinally of the cylinder and cone, substantially as specified.

2. In a corn-shelling machine, a flanged shelling-cone; the flanges being V-shaped in cross-section, to wedge between the rows of grains, one or more supplemental shelling-cones adapted to supplement the flanged shelling-cone; and a skeleton shelling-cylinder within which said flanged shelling-cone and the supplemental cone or cones are revoluble, the ears being caused to pass longitudinally of the cylinder and cone, substantially as specified.

3. In a corn-shelling machine, a shelling-cone having spiral flanges on its surface V-shaped in cross-section, to wedge between the rows of grains; and a skeleton shelling-cylinder within which the spirally-flanged shelling-cone is revoluble, the ears being caused to pass longitudinally of the cylinder and cone, substantially as specified.

4. In a corn-shelling machine, the combination with a skeleton shelling-cylinder, of a shaft revolubly mounted within said shelling-cylinder, a spirally-flanged shelling-cone mounted on said shaft and revoluble therewith, and a force-feed screw conveyer having a spiral feeding-flange encircling said shaft in the same direction as and forming a continuation of the spiral flanges of the said shelling-cone, substantially as specified.

JOHN Q. ADAMS.

Witnesses:
ALOYSIA HELMICH,
A. A. MURRAY.